Nov. 15, 1938.   J. F. KNAPP   2,136,551
EARTH MOVING DEVICE
Filed Sept. 26, 1936   3 Sheets-Sheet 3
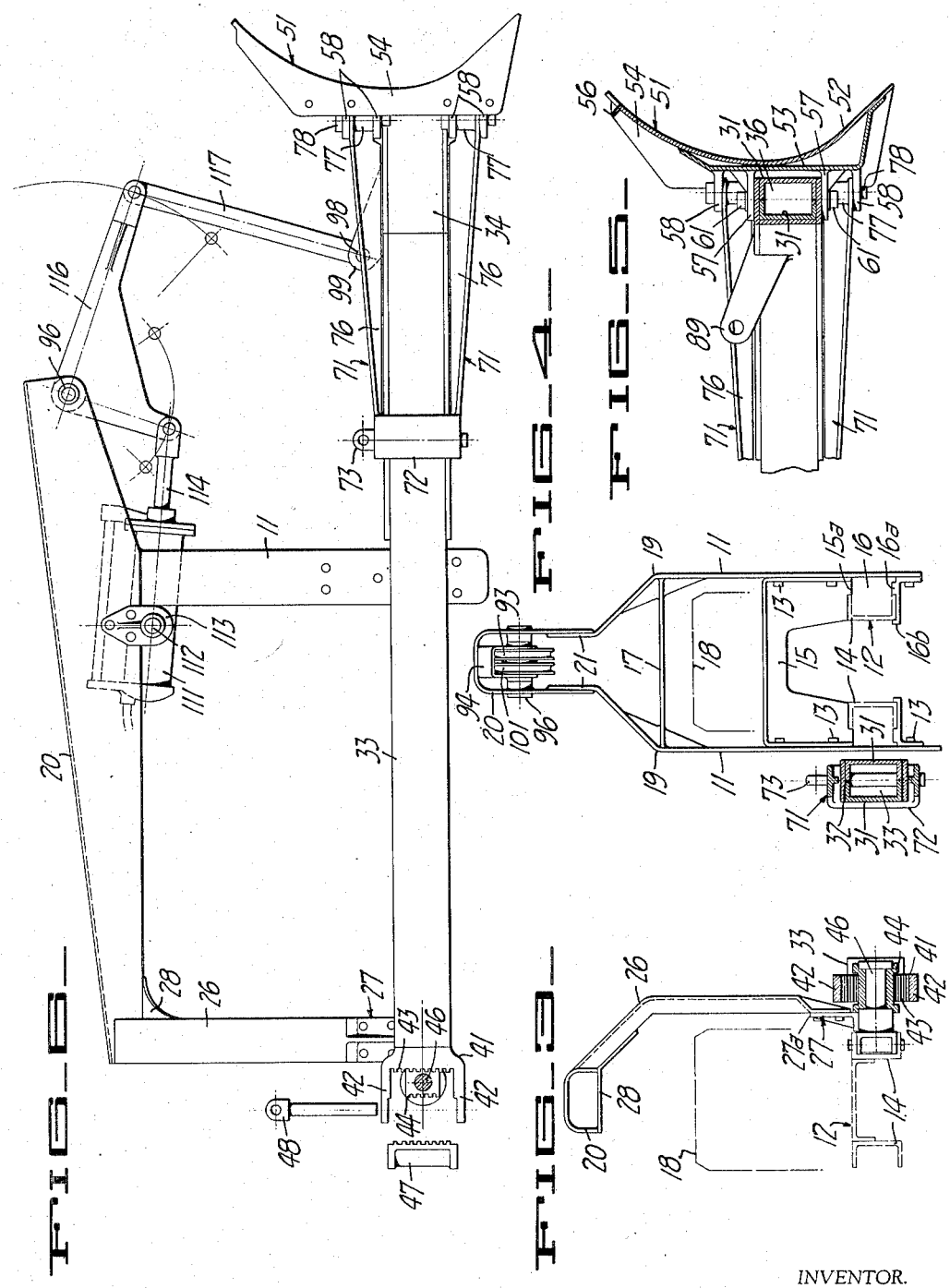
INVENTOR.
John F. Knapp
BY Robert H. Eckhoff
ATTORNEY.

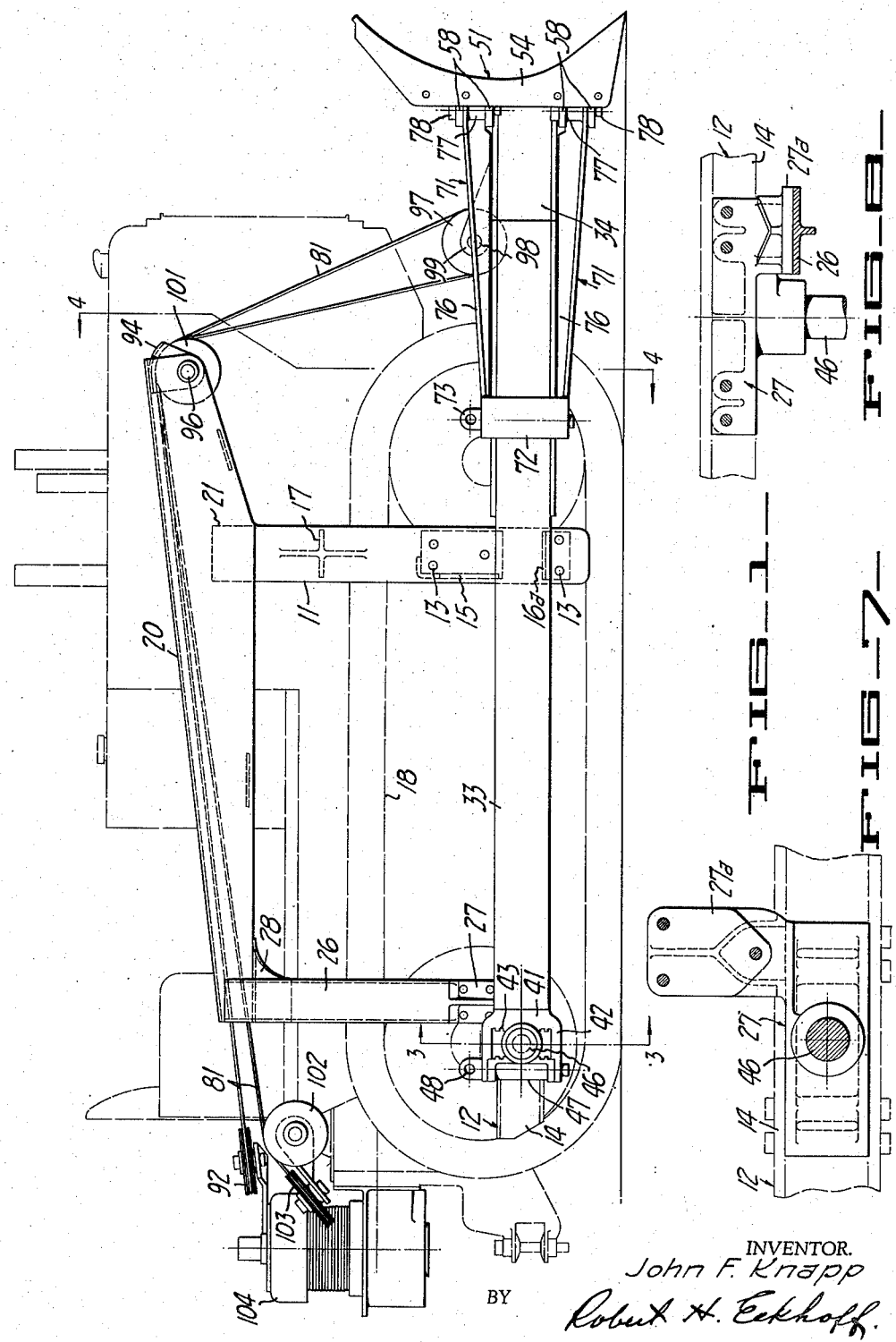

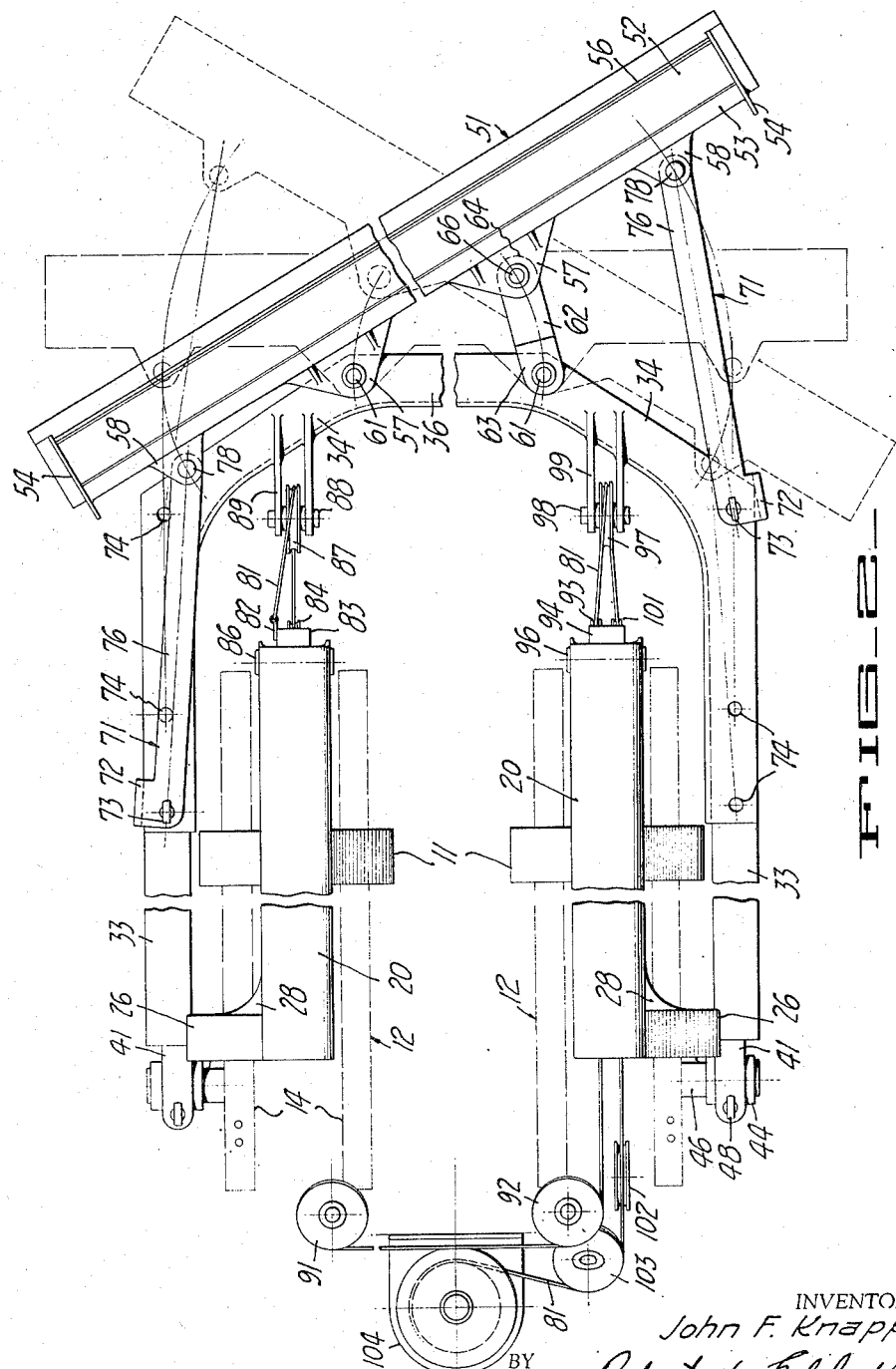

Patented Nov. 15, 1938

2,136,551

UNITED STATES PATENT OFFICE 2,136,551

EARTH MOVING DEVICE

John F. Knapp, Oakland, Calif., assignor to American Tractor Equipment Corporation, a corporation of California Application September 26, 1936, Serial No. 102,744

6 Claims. (Cl. 37—144)

This invention relates to an earth moving device, particularly a bulldozer or trailbuilder structure.

In one of the first power operated machines of this character, Wooldridge utilized an ordinary tractor as the vehicle and mounted the earth handling tool upon a frame carried by the tractor. Wooldridge mounted the means for moving the frame up and down with respect to the tractor entirely upon the truck frame. For details of this structure, see Wooldridge's Patent No. 1,861,731 of June 7, 1932. The Wooldridge structure was not completely acceptable to the trade for it depended upon a cross shaft at the front of the tractor to apply the lifting force of the single power means employed to both track units. This shaft was rather hard to maintain in alignment. In the structure of my invention I have been able to do away with this shaft and still equalize the application of the power lifting means so that power can be applied equally to the opposite sides of the tractor while the tractor trucks are free to oscillate up and down as the tractor moves over uneven earth.

The present auxiliary units for tractors are driven by power derived from the tractor. Broadly, these auxiliary units can be classed as operated either by cable or hydraulic means. In the case of cable operated units, a suitable winch is provided upon the tractor from which one or more cables can be run to operate various units. In the case of hydraulic operated auxiliary units, a pump is mounted upon the tractor and is adapted to be operated thereby. Cable operated units are possibly meeting with better trade reception because of the cost of hose and couplings is relatively greater than that of cable, while hydraulic units, including pumps, cylinders and pistons, are relatively more expensive. However, there is a demand for both units, and it is one of the objects of the present invention to provide a tractor mounting which can be readily adapted to be used either with a cable or a hydraulic operating mechanism. By providing such a structure either mechanism can be mounted upon the tractor, thus lowering the manufacturing cost as well as enabling a user to make the fullest advantage of the structure, depending upon the auxiliary equipment he desires to operate.

In application Serial No. 16,276, of April 15, 1935, Leech has proposed the utilization of plates positioned on opposite sides of each truck frame, mounting the lifting unit for the bulldozer or trailbuilder frame, usually a hydraulic cylinder, piston and bellcrank, between the plates. This structure proved successful from an operating standpoint. However, in practice it was found to throw too much weight and load upon the front idler bearings of the tractor, and some difficulty has been encountered because of this.

It is an object of the present invention to provide a new and useful earth working device structure.

Another object of the invention is to provide an earth working device in which the frames for supporting the manipulative mechanism are carried upon the frames of the tractor truck frames, and not upon any front idler bearing.

A further object of the invention is to provide a structure which can be readily adapted for use either with hydraulic or cable operating mechanism.

The invention includes other objects and features of advantage, some of which, together with the foregoing, will appear hereinafter, wherein the present preferred form of the invention is disclosed.

In the drawings accompanying and forming a part hereof, Figure 1 is a side elevation of a tractor upon which is mounted a structure embodying the present invention. This structure is shown in connection with cable operating mechanism.

Figure 2 is a plan view of the mechanism shown in Figure 1, the body and engine portion of the tractor being cut away.

Figure 3 is a section taken along the line 3—3 of Figure 1.

Figure 4 is a section taken along the line 4—4 of Figure 1.

Figure 5 is a section taken through a portion of the earth working mechanism.

Figure 6 is a side elevation illustrating the ready adaption of the supporting frame and manipulative mechanism for hydraulic operation.

Figure 7 is a side elevation showing a bracket structure.

Figure 8 is a plan view of the bracket structure shown in Figure 7.

In accordance with this invention I provide a relatively simple and inexpensive frame structure for the mounting and support of the manipulative mechanism. This mounting is characterized by lightness, simplicity, low cost and ease of installation.

In Figures 1, 2, 3 and 4 I have shown this mounting as including a pair of members 11 secured to each truck frame 12. As is well known, each truck frame includes opposite channels indicated at 14. The members 11 are joined together by a cast steel plate member 15 across channels 14. Each plate member includes depending projections 15A which depend and extend below the outer faces of each channel to position member 15 and the members 11. Angle brackets 16 having projections 16A and 16B thereon engaging each channel 14 are positioned below each channel. Bolts 13 secure brackets 16 and plate member 15 to members 11.

The members 11 extend upwardly and are joined together by a transverse member 17 welded in place. The transverse member is positioned a considerable distance above the tractor treads 18 so that dirt, mud and the like will not accumulate between the transverse member 17, members 11 and the track. In previous structures, such as that shown in the Leech application aforementioned, mud, dirt and the like would accumulate between the tractor treads and the trucks and would have to be cleaned out periodically, as it interfered with the operation.

The members 11 are bent upon themselves as at 19 so that they extend inwardly over each track. An inverted U member 20, usually formed of a piece of light sheet steel, is welded over the ends 21 of the members 11, the U member 20 extending in the direction of the tracks. As appears in Figure 1, the U member 20 is of a greater depth adjacent the members 11 and inclines slightly downwardly as it extends rearwardly to act as a guide for the cable.

At its rear end each U member 20 is supported by a cast steel support member 26. This member is secured to a bracket, indicated generally at 27, which fits in and is secured in the outer channel 14 adjacent the rear sprocket. The bracket has an upstanding ear 27A slightly in advance of the rear sprocket axle, as appears in Figure 1, to which member 26 is bolted. A reinforcing plate 28 is secured to the U member 20 and the upper portion of member 26 to ensure a stiff and rigid connection between the member 26 and the U member 20.

There are two of the structures described, one on either side of the tractor, as appears in Figure 2, wherein the numerals apply to the same parts on each side of the tractor. There are two brackets 27 and in Figure 7 I have shown one. These brackets are made up to fit the right hand and the left hand side of the tractor.

The frame

I provide for carrying the earth working tool a suitable frame which is extended partially about the tractor. This frame is made up of members suitably welded together. I prefer to employ the construction shown in Figures 4 and 5, wherein opposite like channels 31 are welded together as at 32, along the abutting faces thereof.

The frame includes opposite legs 33 extending parallel to and on the outside of each truck frame. These legs extend forwardly to angular sections 34 which extend in toward the center of the tractor and are connected by a central portion 36 transverse to the longitudinal axis of the tractor. This structure provides, in effect, an A structure, but the top of the A is flat and of some width.

Each leg carries at its rear end a forked casting 41 having opposite arms 42 thereon. This casting includes a serrated face 43 provided with a plurality of serrations complementary to those formed upon a bearing block 44. This bearing block is carried upon a stub shaft 46 which extends from the bracket 27 just below the rear sprocket drive shaft.

In Figure 6 I have shown the structure only partially assembled, while in Figure 1 the structure is shown in assembled condition. By means of the serration provided upon the casting 41 and upon the bearing block 44, the relative position of each leg 33 with respect to the stub shaft 46, and consequently the tractor, can be varied. When a certain desired relationship between the two is attained, member 47 is inserted between the arms 42, as appears in Figure 3, and locking pin 48 is passed through suitable apertures in the arms 42 and member 47. Member 47 is likewise serrated and engages the other side of the bearing block so that the structure is adequately locked in position in any temporary position of adjustment.

It is to be noted that shaft 46 is on the axis of the rear sprocket, the axis about which each truck frame oscillates. This ensures that truck frame oscillation will affect the tool to a minimum extent. At the same time the load force occasioned by the tool is applied to the truck frames on the axis of the rear sprocket so that the force has little off center moment. Thus it has been usual heretofore to support the frames for the tool on the truck frames forward of the drive sprocket axis. This occasioned two disadvantages, namely, the truck frame oscillation would affect the setting of the tool, while the heavy force applied to the truck frames from the working of the tool would be acting about the connection between the truck frames and the main frame of the tractor, the engine and transmission frames, at some little distance, so that the working force would have a moment about the point of connection, thus making the force much more active and harder to care for and giving rise to various types of breakdown in the tractor. By mounting the frame for the earth working tool on the vertical line of center of the axis about which the truck frame rotates, the moment arm is minimized.

The earth working tool

Positioned at the front of the tractor is an earth working tool generally indicated at 51. This tool is only shown as typical of various tools that can be mounted there, the tool including a curved blade 52 backed up by a channel 53 and reinforced by vertical reinforcing plates 54 and horizontal reinforcing members 55.

On its rear face the blade carries ears 57, these ears being provided in upper and lower sets, as appears in Figure 5, and adjacent to the central portion of the blade, as appears in Figure 2. At its outer ends the blade carries spaced pairs of ears 58.

When the blade is straight across the front of the tractor, in a bulldozing position, pins 61 are extended through ears 57 and through suitable apertures at the central portion 36 of the frame so that the blade is in a bulldozing position straight across the tractor, as appears in the broken line position of Figure 2. When it is desired to angle the blade and position it at an angle either to the right or to the left of the longitudinal axis of the tractor, one of the pins 61 is removed and the blade is swung about the other pin into the angular position. In this position the blade extends along one of the angular members 34 as appears in the full line and the dotted line positions in Figure 2.

To support the blade in its extended angular position, link 62 (see Figure 2) is supported with its opposite arms 63 engaged by pin 61 and positioned at the front of the frame, the arms 63 being above and below the frame. The solid end 64 of the link 62 is placed between the ears 57, another pin 66 being inserted in place through the ears and an aperture in end 64. The extending ends of the frame, as appears in Figures 2, 5 and 6, are supported by extension members indicated generally at 71. These members include a portion at the portion 72 extending about each arm 31, and having an aperture therein to pass pin 73. Pin 73 is positionable in any one of the several apertures 74 (Figure 2) to support the blade in its angling position. Arms 76 each extend forwardly from the portion 72 and include two receptacles 77 insertable between pairs of ears 58 and engaging pins 78 inserted therethrough.

The cable operated lifting means

Means are provided for lifting the frame by means of a cable structure. Thus, as appears in Figures 1 and 2, a flexible cable 81 is provided. This cable is secured as at 82 to a housing 83 for a sheave 84. The sheave and the housing are positioned in the left hand U member 20 by a pin 86. The flexible cable extends about a sheave 87 carried by pin 88 between ears 89 secured to the forward portion of the frame. The cable element then passes over the sheave 84 and to the rear of the tractor through the left hand member 20. It is to be noted that the frame protects the cable.

At the rear of the tractor a sheave 91 is mounted, this sheave guiding the cable 81 across the rear of the tractor and about another sheave 92, the cable then extending up the right hand frame member 20 to pass over sheave 93 in a housing 94 positioned at the forward end of the U frame by pin 96. The cable passes downwardly over and about sheave 97 positioned by pin 98 between ears 99 also positioned at the forward end of the frame and corresponding to ears 89. The housing 94 includes another sheave 101 which guides the flexible cable to the rear of the tractor and over vertically positioned sheave 102, which serves to guide the cable about guide sheave 103 to hoist 104.

It is to be noted that one end of the cable is secured to the frame on the tractor while the other end is operated by the hoist indicated generally at 104. Thus a single length of cable can be employed and can be utilized to apply equal lifting movement on both sides of the frame. At the same time, any movement between opposite sides of the frame occasioned by relative movement between the track frames can be equalized by the flexible pulley element trained about and supporting both sides of the frame.

The hoist 104 is operated from the usual power take-off of the tractor, and can be any one of the numerous power hoists now upon the market.

The frame can be readily raised or lowered by manipulating the hoist 104 to either take up or release the cable wound thereon, the control being through the hoist control mechanism conveniently provided for the tractor operator.

It is to be noted as a feature of the present invention that the cable is well protected, being enclosed in the U members 20 on either side of the tractor. This is of advantage for two reasons—first of all, it protects the cable against possible damage, and secondly it protects the tractor operator if the cable should suddenly snap and fly about.

It provides an additional safety factor in that it provides a housing driving the cable; the tractor operator can step upon the housing instead of standing a chance to trip and fall over the cable.

The hydraulic operating means

It is a feature of the present invention that instead of the cable operated means, hydraulic means can be readily installed for the convenience of those contractors and operators who wish to utilize the unit with hydraulic instead of cable operated mechanism. In Figure 6 I have shown a hydraulic cylinder 111 mounted within the member 20 and supported thereon by shaft 112 in brackets 113 secured upon opposite sides of the member 20. Cylinder 111 includes a piston rod 114 which extends to engage one arm of a bellcrank 116. This bellcrank is positioned by pin 96. The other arm of the bellcrank is engaged by a link 117. This link can be of the flexible type disclosed in my previous application Serial No. 717,592 of March 27, 1934. The link extends to and is retained by the pin 98 between ears 99, and upon the opposite side of the tractor by pin 88 between ears 89. There are of course two cylinders, one on each of the members 20, the cylinders being connected by suitable fluid connections to a pump (not shown). The pump can be either positioned at the rear power takeoff or the front power takeoff shaft of the tractor in a manner well known in the art. The cylinders are interconnected to secure fluid equalization when the track frames move relative to each other.

A cable operated unit can be readily converted to a hydraulic operated unit and vice versa, it being merely necessary to remove pins 86 and 96 and install either of the necessary sheaves or bellcranks, mounting the cylinders or else the necessary sheaves about the tractor, a matter of inserting a few bolts or studs. In each case the housing or U member 20 adequately protects the operating mechanism, at the same time providing a light, simple and rugged structure.

I claim:

1. A device of the character described for attachment to a tractor having opposite parallel track frames, two inverted U members, each member being positioned over and extending along a track, a support frame engaging each U member and supported at the front end of each of said track frames, a member supported upon each track frame adjacent the rear end thereof and supporting said U member, an earth working tool, a tool support frame hinged on said track frames for supporting said tool in advance of said tractor, a cable having one end secured on a normally fixed element supported by said support frame, hoist means carried by said tractor at the end thereof, said hoist having attached thereto the other cable end, and pulley elements guiding said cable from said hoist through one of said U members and to and from said hinged tool support frame to return through said one U member across the rear of said tractor to pass through the other U member to said hinged tool support frame and thence to said normally fixed element.

2. A device of the character described for attachment to a tractor having opposite parallel track frames, two inverted U members, each member being positioned over and extending along a track, a support frame engaging each U member and supported at the front end of each of said track frames, a member supported upon each track frame adjacent the rear end thereof and supporting said U member, an earth working tool, a tool support frame hinged on said track frames for supporting said tool in advance of said tractor, a flexible element threaded through said U members, a hoist for said element at the rear of the tractor, pulleys mounted on each U member and guiding said flexible element through said U members from said hoist for raising and lowering said tool support frame and means on said tool support frame engaged with said flexible element whereby said element can raise and lower said frame.

3. A device of the character described for attachment to a tractor having opposite parallel track frames, two inverted U members, each member being positioned over and extending along a track, a support frame engaging each U member and supported at the front end of each of said track frames, a member supported upon each track frame adjacent the rear end thereof and supporting said U member, an earth working tool, a tool support frame hinged on said track frames for supporting said tool in advance of said tractor, and a hydraulic cylinder mounted in and partially confined by each of said U members for raising and lowering said tool support frame.

4. A device of the character described for attachment to a tractor having opposite parallel track frames, two inverted U members, each of said U members being positioned over and extending along a track, an inverted U frame engaging each U member and supported at the front end of each of said track frames in inverted position, a member supported upon each track frame adjacent the rear end thereof and supporting said U member, an earth working tool, a tool support frame hinged on said track frames for supporting said tool in advance of said tractor, and means extending between the confines of each of said U members and mounted thereon for raising and lowering said tool support frame.

5. In a device of the character described for attachment to a tractor having track frames, a structure for attachment to each track frame consisting of a forward support frame having spaced members secured on opposite sides of said track frame, a member securing said spaced members together above said track frames and positioning said members with respect to each other above said track frame, means engaging said track frame for securing said spaced members and said member in position on said track frame, brackets secured to the outside of each track frame adjacent the end thereof, a support member secured to a bracket and curved about said track frame to a position over said track, a conduit member secured to said spaced members and to said support member and including an open portion extending downwardly adjacent the front end of the tractor, said open portion providing a support for means for use in raising and lowering a tool carried in advance of the tractor.

6. In a device of the character described, an earth working tool, a tractor having a power take-off, a hoist operated by said power take-off, a tool frame hinged on said tractor and carrying said tool at the forward end of said tractor, frames supported by track frames on the tractor, each frame including an inverted U member over each track, sheaves carried by said frames and by said tool frame, a cable secured to a fixed element on one of said frames and passed about a sheave on said tool frame and back over a sheave on one of said frames and down through the U member of said one frame, sheaves guiding said cable across said tractor and up the U member of the other one of said frames to pass about a sheave on said tool frame and back over a sheave on said U member of said other frame to pass down said other frame to said hoist.

JOHN F. KNAPP.